United States Patent
Robinson

[15] 3,699,198
[45] Oct. 17, 1972

[54] METHOD OF MAKING SHAPED ARTICLES

[72] Inventor: Keith D. Robinson, Mogadore, Ohio

[73] Assignee: The Goodyear Tire & Rubber Company, Akron, Ohio

[22] Filed: Sept. 29, 1969

[21] Appl. No.: 863,014

Related U.S. Application Data

[63] Continuation of Ser. No. 751,018, June 19, 1968, abandoned, which is a continuation of Ser. No. 379,078, June 30, 1964, abandoned.

[52] U.S. Cl. .................... 264/96, 264/255, 264/258, 264/264, 264/275, 264/279, 264/309, 264/335

[51] Int. Cl. ....... B29c 13/04, B29h 7/03, B32b 27/12, B32b 27/40

[58] Field of Search........264/242, 335, 96, 250, 255, 264/257, 258, 259, 264, 271, 275, 278, 279, 309; 117/161 KP, 161 UH

[56] References Cited

UNITED STATES PATENTS

| | | | |
|---|---|---|---|
| 2,241,385 | 5/1941 | Beal | 264/264 X |
| 2,935,320 | 5/1960 | Chupa | 264/279 X |
| 3,281,396 | 10/1966 | Barnes | 264/309 X |

*Primary Examiner*—Robert F. White
*Assistant Examiner*—J. H. Silbaugh
*Attorney*—F. W. Brunner and J. D. Wolfe

[57] ABSTRACT

This invention relates to a method of making an article having a plane of symmetry whereby a portion of the article is used as the form for building the second part of the article and the material used to build the article is a polyurethane reaction mixture, including a method of attaching fittings to said article during construction by releasably attaching the fitting to one surface of the article.

1 Claim, 6 Drawing Figures

PATENTED OCT 17 1972  3,699,198
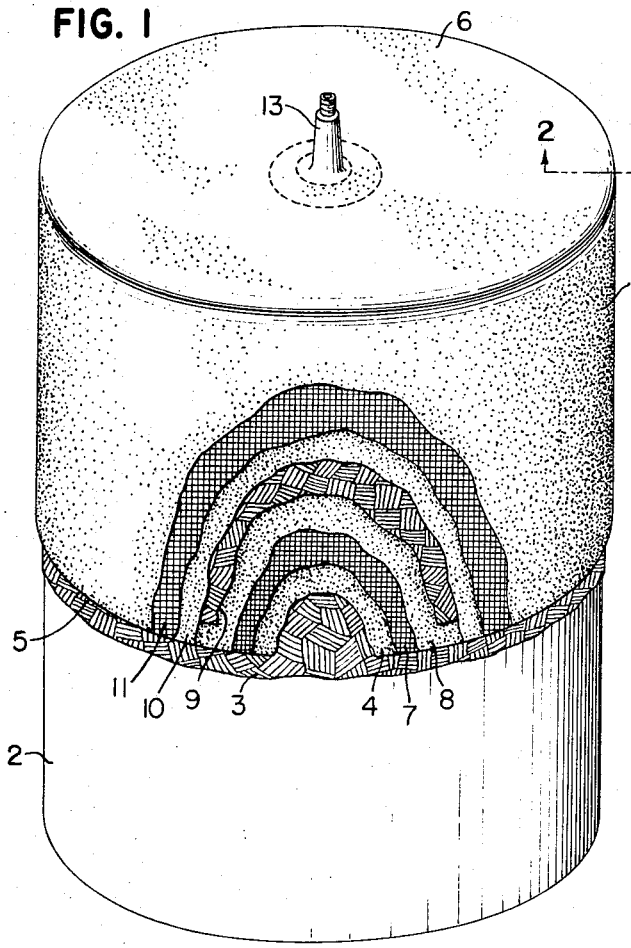
FIG. 1
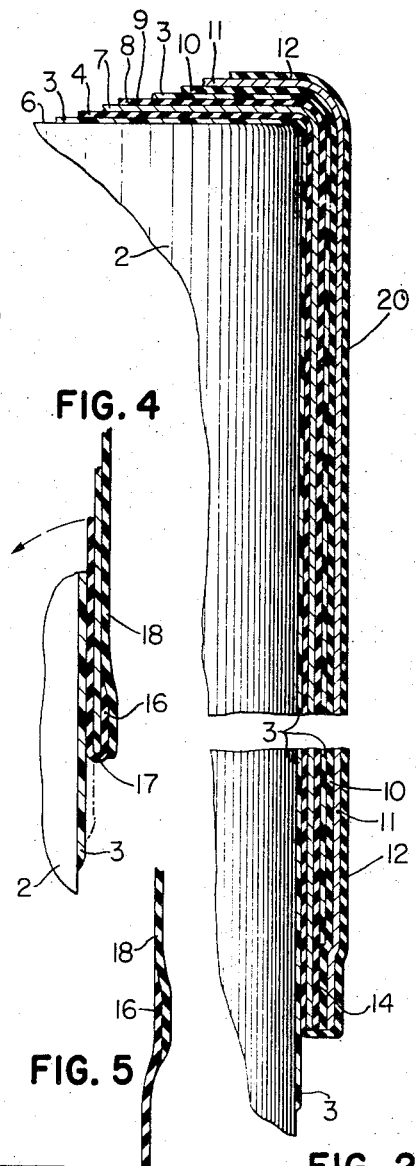
FIG. 2
FIG. 4
FIG. 5
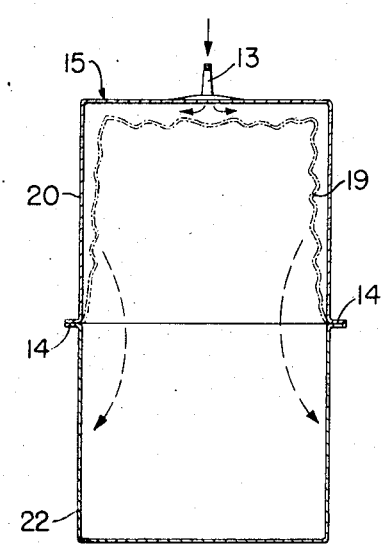
FIG. 3
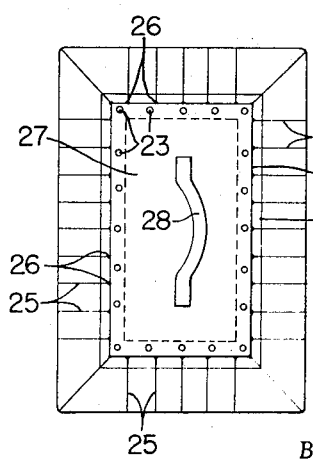
FIG. 6
INVENTOR.
KEITH D. ROBINSON
BY
J.B. Holden
ATTORNEY

METHOD OF MAKING SHAPED ARTICLES

This application is a continuation of Ser. No. 751,018 filed June 19, 1968, now abandoned, which is a continuation of Ser. No. 379,078, filed June 30, 1964, now abandoned.

This invention relates to a method of constructing various articles wherein at least part of the article serves as a building form for building another part thereof.

In making plastic or elastomeric boxes, barrels, pillars, cushions and related objects, difficulty is experienced in shaping and obtaining closures of the articles. An object of this invention is to provide a novel method of producing articles of this type. The object of this invention and the advantages thereof should be apparent in view of the following detailed description and the drawings.

In these drawings

FIG. 1 is a perspective view of the building form with the various coatings of material applied thereto to build the container shown more clearly by the cut-away portion.

FIG. 2 is an enlarged cross-sectional view along line 1—1 of FIG. 1 where the container is of the pinch seam type.

FIG. 3 is a view in partial cross-section of a container of the pinched seam type.

FIG. 4 is a partial cross-section view of the building form in the seam area where the form has a container containing a lap seam thereon.

FIG. 5 is a diagrammatic cross-section through the seam area of the container to show the lap seam where the two parts have been separated to give the container its filled contour.

FIG. 6 is a top view of a rectangular container.

Referring more specifically to FIG. 1, numeral 2 is a metal drum which has been coated partially with a releasing agent 3, i.e., the upper portion of the drum and has had at least one coat of a material 4 applied over the releasing agent 3 at least down to the line indicated by numeral 5 to thereby form the lower portion of the container 22 when it is moved downward out of the position 19.

In the practice of this invention it is preferred that the application of the coat or coatings to form the line 5 be located essentially half way of the drum. Of course, it should be apparent that it is possible by choosing the position of line 5 from the top of the drum 6 to vary the over-all length dimension of the finished article.

If desired, a fabric or wire reinforcement 7 may be applied over the coating 4 while the coating 4 is still tacky. Then additional coats of material 8 may be applied over the reinforcing material 7. Once the coating material 8 has been cured to the point where it is essentially free of tackiness the releasing agent is applied over the coat 8 to cover the entire outer surface 9 of the coating 8 except in the seam area.

With the releasing agent in position 9 over the coat 8 the choice is available to the practicioner of this invention as to the type of seam to be formed. He may choose to form a lap seam or a pinched seam. The following discussion will relate to building the container wherein the finished container has a pinched seam.

In the pinched seam method of construction after a portion of the container has been built up on drum 2 in the manner described above and the release coat covers the surface 9 except in the seam area 14, best seen in FIG. 3, a further coat 10 of a material is applied over the surface 9 covered with the releasing agent 3. Then the fabric reinforcement is applied where desired. The fabric reinforcement may be in two parts or all one part. In the event it is of all one part, the extra fabric for the upper portion 20 of the container will be hanging down to the bottom of the drum 2 and it is turned up over the coating of polyurethane to form the reinforcing barrier 11. Alternately, the fabric material may be applied by placing it over lower part of container as shown by 7 and then fabric 11 is applied and joined to form a seam. With the fabric reinforcement 11 in place then additional coats of material 12 may be applied thereover to form the finished container.

Since it is desirable that containers have at least one access opening, it is the preferred practice that a fitting 13 be positioned on the surface 9 of the release coat prior to the application of the coating 10, the reinforcement 11 and the coat 12. Thus, the fitting 13 is built into and becomes an integral part of the container.

The finished container may be removed from drum 2 by attaching the fitting 13 to a suitable fluid line such as air or water and then inflating the container by fluid pressure to cause the two parts of the container to separate along the surface 9 formed by the release coat. If the two parts of the container are separated by the fluid pressure along the surface 9 formed by the release coating, the container should readily come off of the building form 2. If this does not happen, then the removal of the container from the drum may be aided by the insertion of an air line underneath the container in the vicinity of line 5 and gently blowing the container loose and off of the building form 2. The finished container removed from the building form may have its two parts parted along the surface 9, to move the first built portion 22 downward and thereby give the finished container 15 the appearance shown in FIG. 3.

In the lap seam mode of construction, once release coat 9 has been applied over the article then the bottom part of the coating on the drum 2 is rolled up from about the line 5 to the position best seen in FIG. 4 and shown by numeral 16. To be more precise when viewing the form of the container after the turn-up called for above, the container will form essentially a U as illustrated by numeral 17 of FIG. 4. With the member turned up to form the U 17, an additional coat or coats of polyurethane material is sprayed over the release coat 9 and the turned-up part 16 to form the layer 18. Then additional layers of fabric reinforcement and polyurethane may be added in accordance with the procedure called for where the construction is of the pinched seam type to give the lap seam construction shown in FIG. 5.

The releasing agents useful in this invention are those normally used to give mold release to elastomeric or plastic materials. Where the material is a polyurethane reaction mixture the preferred release agents are the mineral waxes, polyethylene and polypropylene, although those used in making polyurethane molded foam or non-porous articles may be used, too. It should be noted that there is no need to cover the building form with a release coat where the coating material does not adhere to the form.

Although the coating may be applied to the building operations by dipping or brushing, spraying is the preferred method of application as this permits building of the containers very rapidly and economically. The preferred material for the coatings 4, 8, 10 and 12 is a liquid polyurethane reaction mixture although other rubbery cements such as those of natural rubber and synthetic rubber of the polyolefin type or even the polyesters, may be used. It should be understood that where other rubbery cements are used then the various coatings used in forming the container will have to be subjected to a cure treatment at elevated temperatures and frequently under pressure. The polyurethane liquid reaction mixtures are the preferred coatings for building containers in accordance with this invention as the heat and pressure curing procedure may be omitted in most cases.

The liquid polyurethane reaction mixtures are well known to the art and may be formed by making a mixture of a reactive hydrogen containing polymeric material of about 400 to about 4,000 molecular weight with an organic polyisocyanate and if the polyisocyanate is used in excess it is preferred that the reaction mixture contain a crosslinking agent usually selected from the class consisting of organic diamines, monomeric glycols and monomeric polyols, and amino alcohols. To facilitate spraying and to help control the rate of reaction it is desirable that a solvent be added to the liquid polyurethane reaction mixture. The amount of solvent used will depend upon the nature of the spray equipment and the particular components found in the reaction mixture. Usually about 5 to 65 percent of solvent will be used with the preferred range being 10 to 30 percent by weight. It should be appreciated that with the smaller amounts of solvent it is possible to lay down thicker coats of material and thus avoid the necessity of making several coating applications.

Suitable reactive hydrogen containing polymeric materials are the polyester polyols, polyether polyols, polyester amides and the polymeric hydrocarbon polyols, within the molecular weight range of about 400 to 4,000 and preferably 1,500 to 3,000.

Representative members of the polyester polyols are those esters formed by the reaction of the glycols such as ethylene, propylene and butylene with the organic acids such as the lower aliphatic dicarboxylic acids and the aromatic dicarboxylic acid or their anhydrides. Representative examples of the dicarboxylic acids are glutaric, adipic, azelaic, phthalic, terephthalic and isophthalic. Of course, it should be appreciated that tri- and higher functional acids may be used, especially where it is desired that the container be rigid or maintain its form when not under pressure. Also, other polyfunctional materials than the polycarboxylic acids may be used in forming the esters to give a tri- or higher functional polyester. Examples of these are glycerine, trimethylol propane, trimethylol ethane and pentaerythritol.

Representative of the many polyether polyols that may be used are the polyethers formed by polymerizing tetrahydrofuran and the alkylene oxides such as ethylene and propylene. It is well known that the alkylene oxides having from two to 10 carbon atoms may be condensed on a nucleus generating material to give polyethers having from two up to eight or more hydroxyl groups.

Representative of these nucleus generating materials is trimethylol propane, trimethylol ethane, pentaerythritol, glycerine and the carboxylic acids listed hereinbefore or the polyfunctional amines such as ethylene diamine or phenylene diamine and the amino alcohols, for instance, 2-methyl-2-amino-propanol.

Representative examples of the hydroxyl terminated hydrocarbon are the reaction products obtained by the polymerization of a diene such as butadiene or isoprene with lithium or other alkali metals to form a metal adduct and then hydroxyl terminating the metal adduct by reacting with an alkylene oxide such as ethylene oxide or propylene oxide and then treating with water.

Any of a wide variety of organic polyisocyanates may be employed to prepare the polymers useful in this invention including aromatic, aliphatic and cycloaliphatic diisocyanates and mixtures of two or more of these.

Representative isocyanate compounds include 2,4-toluene diisocyanate and 2,6-toluene diisocyanate and mixtures of these; phenylene diisocyanate; 4,4'-diphenylene diisocyanate; 4,4'-diphenylene methane diisocyanate; dianisidine diisocyanate; 4,4'-tolidine diisocyanate, 4,4'-diphenyl ether diisocyanate; 1,6-hexamethylene diisocyanate.

Normally the isocyanates will be used in excess relative to the reactive hydrogen containing material with the excess being at least about 1.1 mols up to about 2.5 mols for each mol of reactive hydrogen containing material, with the preferred range being about 1.5 to 2.0 mols.

The amount of crosslinker used may be equivalent to the excess isocyanate over that required to react with the reactive hydrogen containing polymeric material. Normally, the amount of crosslinker used will be about 0.4 to 0.9 mols per mol of reactive hydrogen containing material.

Representative examples of the crosslinkers are the monomeric polyols, organic diamines and amino alcohols. Representative examples of the monomeric polyols are ethylene, propylene and butylene glycol with butylene glycol being preferred.

Representative examples of the diamines are the slow diamines such as ortho dichloro benzidine and methylene bis chloroaniline; bis amino phenyl sulfone and the fast diamines such as methylene dianiline.

Suitable fabric or wire reinforcement material is nylon, wool, cotton, polyester, glass fibers and the fine mesh screens made of the metals such as copper or steel. Also, glass reinforcement may be used. The fabric reinforcement may be either knitted or woven. Alternately, the fabric may be chopped into short lengths and sprayed onto the surface of the form to give a jack straw type reinforcement.

The following examples illustrate the invention without, however, limiting it:

EXAMPLE I

A prepolymer was prepared from 1 mol of a mixed 80 percent ethylene, 20 percent propylene adipate having the reactive number of 60 ± 5 and 2 mols of the commercial 80/20 isomeric 2,4/2,6 toluene diisocyanate. The prepolymer had a free isocyanate content of about 3.5 to 4 percent. A solution was prepared according to the following recipe:

200 parts prepolymer 60 parts cellosolve acetate 60 parts methyl ethyl ketone 10 parts 10 percent solution cellulose acetate butyrate in cellosolve acetate Then this prepolymer was fed to a two-component spray gun in those proportions to feed 50 parts of the prepolymer solution at room temperature for each 10 parts of a 2-nitro propane solution containing 2.5 grams of 3,3′-dimethyl-4,4′-diamino diphenyl methane to give the polyurethane reaction mixture. This polyurethane reaction mixture was sprayed over a metal drum which had previously been coated with a release coat of a water dispersion of a polyethylene of about 1,000–2,000 molecular weight. Then a second coat was applied to give a coat thickness of about 10–15 mils. A nylon fabric was spread over the polyurethane coating and two additional coats of sprayed polyurethane was applied over the nylon fabric. Over the last coat of polyurethane was applied a release coat of the water dispersion of polyethylene. A fitting 13 was placed on the drum in the position shown in FIG. 1, after which the bottom portion of the coating was turned up to form a U and an additional coat of polyurethane was sprayed over the turned-up portion and the release coat to form the first layer of the top portion of the container. After the second coat of polyurethane had been applied in forming the upper portion of the container, a nylon fabric was applied over this portion and was followed by two coats of sprayed polyurethane. When the last coat had dried the container was removed from the drum by blowing air through the fitting 13 to cause the first built portion to separate from the second built portion and thus inflate the container.

EXAMPLE II

A second container was made according to the procedure of Example I except the first built portion was not turned up and the release coat 9 did not extend all the way to the bottom of the first polyurethane sprayed portion. Thus a band of about 1 to 2 inches at the bottom of the first sprayed built-up portion of the container was not coated with the release coat. Then the polyurethane was sprayed over the bottom portion of the container followed by nylon fabric and additional sprayed coats of polyurethane to build the upper portion of the container. Thus, when this container was removed from the building form and fully extended it was of the pinched seam type shown in FIG. 3. The polyurethane reaction mixture used in building this container was prepared by the following method:

A mixture of a mixed 80 mol percent ethylene — 20 mol percent propylene adipate (200 parts) having a reactive number 63.5 and 200 parts of tetramethylene adipate having a reactive number of 55.3 was placed in a reaction resin flask and then the polyesters were dried under vacuum at 90°–110° C. for 1 hour. Then 74.7 parts of toluene diisocyanate was added to the resin flask and allowed to react for 1 hour to form the prepolymer. This prepolymer was dissolved in about 20 percent methyl ethyl ketone. This solution of the prepolymer was then charged to one of the tanks of a two-component spray gun and was forced from the spray gun at the ratio to give an admixture with a mixture comprising 20 parts of the above polyester having dissolved therein 40.8 parts of 4,4′-methylene bis (2-chloroaniline) for about each 500 parts of prepolymer.

Instead of the above prepolymers a prepolymer made by reacting 2 mols of toluene diisocyanate with 1 mol of poly tetramethylene ether glycol having a molecular weight of about 3,000 may be used. In fact, on some occasions it is desirable to use a polyether type prepolymer for the initial coat and the last coat in building the containers with the inside coats being of the polyester type prepolymer. This mode of construction gives a container having enhanced resistance to bacterial and other resistance to service degradation but yet gives appreciably enhanced strength properties. Also, it should be noted that in some cases it may be desirable to have at least one of the inner coats of polyurethane to be porous or cellular in nature and thereby enhance the rigidity of the container. This may be achieved by using a small amount of a blowing agent such as the volatile solvents, for instance, a fluorohydrocarbon or water.

Also, it may be desirable to use a mixture of relatively high molecular weight reactive hydrogen containing materials along with some very low molecular weight reactive hydrogen materials, for instance, a material having a molecular weight of about 400. This will permit containers to be obtained which have an enhanced degree of rigidity but some flexibility. Also enhancement in strength and rigidity may be obtained by using fillers such as Cab-O-Sil and carbon blacks.

EXAMPLE III

A rectangular container may be made by coating the upper part of a polyethylene finished cardboard box with a first coat of a liquid polyurethane reaction mixture, comprising (1) a polybutadiene of about 2,000 molecular weight and having attached thereto in essentially terminal relationship two oxyethylene hydroxyl radicals; (2) a toluene diisocyanate, and (3) ortho dichloro benzidine. Then wire load and reinforcing members 25 are applied over the polyurethane coating and embedded therein by application of at least one other coat. A release coat of a solvent solution of polyethylene is applied over the polyurethane except in the seam area and the fitting opening best seen in FIG. 6. The fitting 21 is placed over the uncoated fitting opening and the load distributing member 24 forming part of the fitting is positioned as shown. Then the wire reinforcing members 25 are bent upward in the manner shown, for instance, in FIG. 4 and fastened to the fitting 21 by weld or other means at the points 26. It is desirable at this point to cover the fitting to protect it from spray during the application of the polyurethane coating over the first portion of the container to form the second portion. If desired a cover 27 may be placed over the fitting and fastened by bolts 23. It is desirable that the cover have a suitable handle 28 for lifting the container.

By this method it is possible to make various shaped articles which have a plane of symmetry as illustrated in the foregoing examples. Also, it has been illustrated that articles of this type may be made with various materials which may be applied by spraying, dipping or brushing on a surface where the materials may be either applied as a solvent solution or as a liquid or a melting material such as a melted polyolefin.

While certain representative embodiments and details have been shown for the purpose of illustrating the invention it will be apparent to those skilled in this art that various changes and modifications may be made therein without departing from the spirit or scope of the invention.

What is claimed is:

1. A method of making articles having a plane of symmetry consisting essentially of applying multiple spray coats of a polyurethane reaction mixture to a building form having a surface to which the mixture does not adhere to form a first portion of said article, reacting said mixture to give a coat essentially free of tack, applying a release coat over the first portion except in the seam area and then applying multiple spray coats of a polyurethane reaction mixture over the first portion including the part covered with the release coat to join the two portions about the plane of symmetry, reacting the mixture to give a finished polyurethane article on the building form, and removing the article from the building form to obtain the article with the first part separated from the second part, where the release coat lay therebetween, said multiple spray coats comprising an initial and last coat of a polyetherurethane and the coat inside the initial and last coat being a polyesterurethane.

* * * * *